United States Patent

[11] 3,534,782

[72] Inventors Terry A. Young
Akron, Ohio;
Owen B. Funsch, Rockmart, Georgia
[21] Appl. No. 755,542
[22] Filed Aug. 27, 1968
[45] Patented Oct. 20, 1970
[73] Assignee The Goodyear Tire & Rubber Company
Akron, Ohio
a corporation of Ohio

[54] TIRE REINFORCEMENT FABRIC
6 Claims, 1 Drawing Fig.
[52] U.S. Cl. .................................................. 139/426,
57/140, 152/358
[51] Int. Cl. .................................................. D03d 15/00
D02g 3/02, B60c 5/00
[50] Field of Search ................................... 139/426,
420, 383; 57/140, 140(Blend); 152/357 to 359;
161/90 to 92

[56] References Cited
UNITED STATES PATENTS
| | | | |
|---|---|---|---|
| 1,875,445 | 9/1932 | Hall ............................ | 139/426 |
| 3,371,475 | 3/1968 | Gorrafa ....................... | 57/140 |
| 3,395,744 | 8/1968 | Wolf et al. .................. | 152/358 |

FOREIGN PATENTS
| | | | |
|---|---|---|---|
| 596,855 | 4/1960 | Canada ....................... | 57/140(BUX) |
| 697,467 | 11/1964 | Canada ....................... | 152/359 |
| 610,096 | 10/1948 | Great Britain .............. | '57/140(BUX) |
| 1,044,230 | 9/1966 | Great Britain .............. | 139/426 |

*Primary Examiner*—James Kee Chi
*Attorneys*—F. W. Brunner and R.S. Washburn

ABSTRACT: A tire cord fabric with improved resistance to webbing and splitting during adhesive treatment and during drying and stretching as well as in handling and shipping, includes warp cords of high strength material such as polyester and weft or filling threads composed of a blend of polyester fiber and cotton fiber.

Patented Oct. 20, 1970 3,534,782
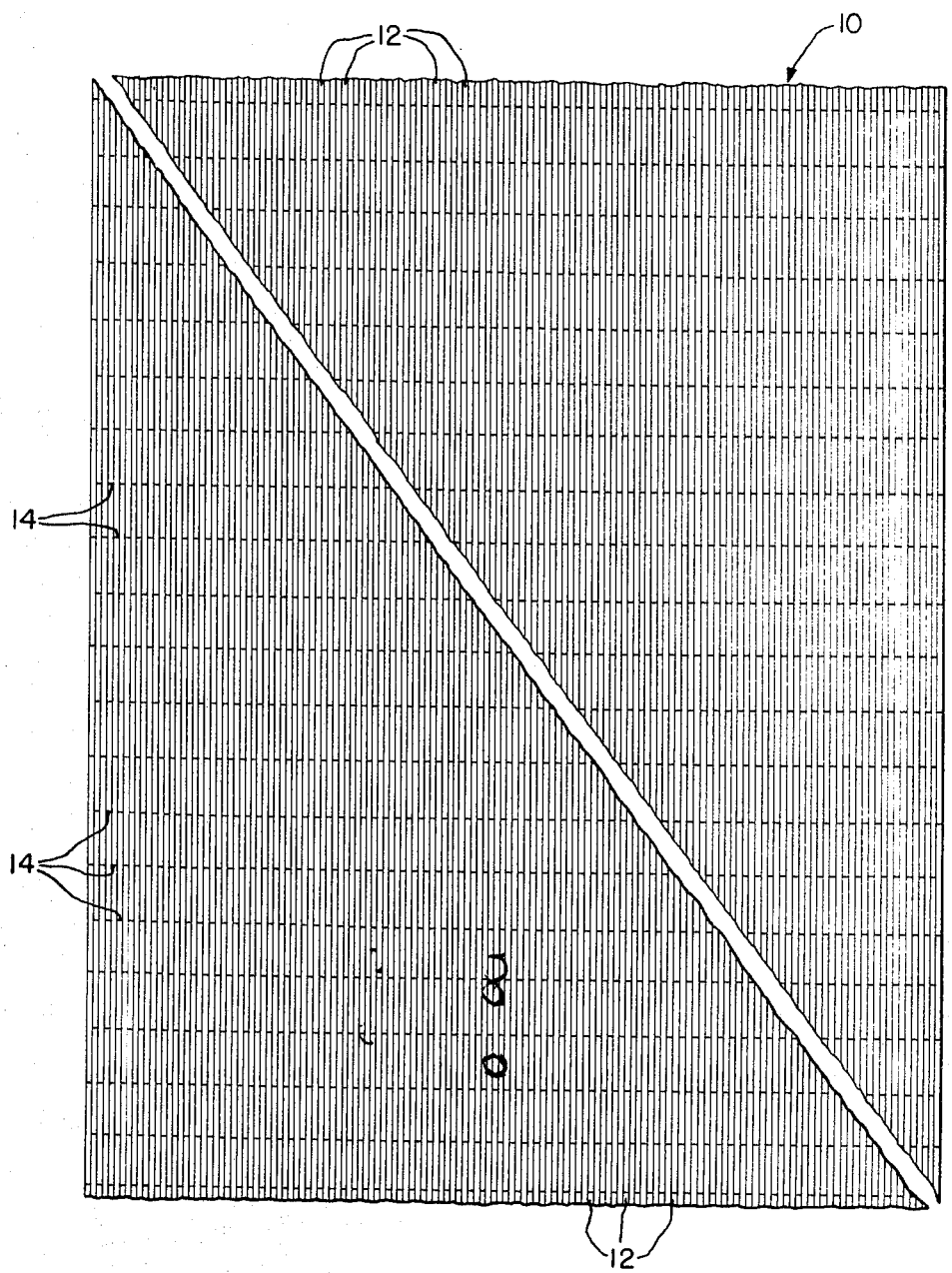
INVENTOR.
OWEN B. FUNSCH
TERRY A. YOUNG
BY
R. S. Washburn
AGENT

TIRE REINFORCEMENT FABRIC

The foregoing abstract is not to be taken as limiting the invention of this application, and in order to understand the full nature and extent of the technical disclosure of this application, reference must be made to the accompanying drawing and the following detailed description.

The present invention relates to cord fabric for reinforcement of pneumatic tires and particularly to a tire reinforcement fabric including an improved weft yarn or fill thread.

Tire reinforcement fabric for use in reinforcement of pneumatic tires is conventionally made with warp cords or strength members extending parallel to one another in a common plane and with relatively weak weft threads generally woven over and under successive warp cords so as to maintain the parallelism and spacing of the cords in the plane of the fabric. This is the simplest and most economical method of forming such fabrics. There have been, however, disadvantages accompanying the use of weft threads and repeated attempts have been made to provide improvement in maintaining the relationship of the warp cords in cord fabrics throughout their processing prior to use of the fabric in pneumatic tires.

The weft threads or yarns perform no useful function in a completed tire and may be detrimental if the warp cords are not uniformly permitted to assume their correct circumferential or lateral positions and spacing when, for example, the tire is shaped from cylindrical to the generally toroidal shape of a completed pneumatic tire.

Tire cord fabric, after the weaving of warp cords and weft threads, is conventionally subjected to processing which includes application of adhesives in either aqueous or solvent solutions and exposure to relatively high processing temperatures. The fabric is also subjected to considerable tension one or more times during its processing. Before the fabric is incorporated into a tire it is also generally coated with uncured rubber compounds, as by calendering between rolls so that the rubber compound completely surrounds and adherently covers the warp cords of the fabric.

A particular difficulty experienced in treating tire cord fabric heretofore available has been the tendency of adhesives to cause the warp cords to adhere to each other, as well as to bridge or fill the spaces between adjacent cords. When such bridging or webbing occurs, the individual cords are restrained from assuming their proper spacing during subsequent processing or during the building and shaping of the tire. Rubber compounds are prevented from surrounding the individual cords.

Heretofore, weft threads employed in tire reinforcement fabrics have been generally of cotton yarn. It has also been proposed to use yarns or filaments of organic esters, or ethers of cellulose, having low or suppressed extensibility, but such that the weft threads could be dissolved out or absorbed into surrounding compounds from the fabric either prior to or during the vulcanization of the assembled tire. A further proposal has been to use, as weft threads, continuous filaments of highly extensible material such as rubber or rubberlike materials, or nonoriented crystalline synthetic polymers prepared to be extensible by from 50 to several 100 percent.

It has been found that none of the materials heretofore used or proposed as weft threads for use in tire reinforcing fabrics have been able fully to satisfy the requirements of controlling the parallelism and spacing of the warp cords during the processing referred to above, particularly as applied to polyester tire reinforcement fabrics.

It is an object of the present invention to provide an improved tire reinforcement fabric including novel weft threads capable of maintaining uniformity of the weave of the fabric. A further object of the invention is to provide a weft thread or yarn having improved performance under exposure to heat and to the stresses encountered in processing the reinforcement fabric. An additional object of the invention to is provide a tire reinforcement fabric having warp cords comprising continuous filaments of polyester and weft or pick threads comprising a yarn blended of noncontinuous or staple fibers of polyester and staple fibers of cotton.

Other objects and advantages will become apparent or will be particularly pointed out in the description herein of particular embodiments illustrative of the invention.

These objects are achieved in accordance with the present invention by the provision of a tire reinforcement fabric having warp cords extending in a common plane parallel to one another in a first direction, and weft or filling threads arranged transversely with respect to the first direction, the weft threads comprising a yarn blended of cotton fiber and of short discontinuous lengths of synthetic polymeric filaments.

The accompanying drawing is a diagrammatic view of a reinforcement fabric embodying the principles of the invention.

In the drawing, the fabric 10 comprises a plurality of warp cords 12 which extend longitudinally in the fabric along an indefinite running length thereof and which provide the reinforcement strength members in a tire or in a cord-reinforced rubber article. The cords 12 generally comprise a plurality of yarns each having a multiplicity of continuous filaments plied or twisted together to form the cord. The filaments of the cords may be of any material suitable for use in reinforcement in pneumatic tires and the like. In the practice of the present invention cords comprising filaments of a polyester are found particularly useful.

The weft threads 14, also called pick, filling, or fill threads or yarns, are woven alternately over and under adjacent cords throughout the width of the fabric from selvage to selvage thereof. Individual weft threads in the fabric 10 are spaced about one-quarter inch to as much as 1 inch from each other along the running length of the fabric. Because weft threads must be readily cut or broken for building a tire, the tensile strength of weft yarns is desirably limited to a low value and are small in size.

In accordance with the present invention, the weft threads 14 comprise a single spun yarn blended of short lengths, sometimes referred to as staple, of a synthetic polymeric fiber, and cotton fibers. The synthetic polymer or resin of the filament is preferably a polyester. The proportion of the blends can be from 80 percent synthetic fiber and 20 percent cotton to 20 percent synthetic resin fiber and 80 percent cotton. The presently preferred proportions are about 60 percent of polyester fiber and 40 percent of cotton fiber. The weft thread or yarn 14 in the present embodiment is a singles yarn of 21$s$ (the number of 840 yard lengths in 1 pound, according to the cotton number system) having in the greige state a breaking strength of about 1 pound (450 grams) and a twist of approximately 21 turns per inch. Weft yarns may range from 18$s$ to 26$s$ (cotton number system) in the ambit of the present invention.

Weft yarns according to the present invention however are characterized by having in the greige state from about 2 to about 4 times the elongation at break possessed by conventional cotton filling thread of like size and weight. The pick threads 14 have an elongation at break particularly of approximately 3 times the elongation at break of a cotton thread of like size and weight providing a significant improvement over the cotton thread, while the size and softness of the weft yarn according to the invention are at least as satisfactory as conventional weft yarns.

We have found furthermore that our improved filling thread is less subject to longitudinal shrinkage during exposure of the yarn to adhesive solutions and to heat. Our weft or filling thread therefore provides improved resistance against the tendency, experienced with weft or pick threads of the prior art, to cause the cords in the fabric to move closer together during treatment, thus making the fabric more narrow. This tendency, common in pick or weft threads of the prior art, causes adjacent cords to adhere to one another, and/or to form a film or web of adhesive therebetween which, as is known, is detrimental both in the subsequent processing and in the tire in which the fabric is used. The weft yarn according to the invention has sufficient strength to permit handling of the reinforcement fabric during normal processing with greatly reduced breakage of the individual or of successive pick threads, thus resisting the tendency to split during processing. Furthermore, there appears to be less tendency to slippage at the contacts between cords and weft yarns which characteristic appears to improve further the stability of the fabric. The greater elongation possessed by the yarns 14 not only greatly improves the shock resistance of the fabric during handling and shipping but additionally enables increased spreading of the fabric immediately before and immediately after its immersion in adhesive solution so as to enable the amount of adhesive applied to be increased, as well as to permit spreading movement tending to separate adjacent cords one from another so as to counteract the tendency of the adhesive to bridge or web the spaces between the cords.

In the table below, representative values of breaking strength in pounds (lbs.) avoirdupois and of elongation at break, in percent of unstressed length of weft or pick threads are set forth. In the all-cotton pick threads of the prior art, elongation at break is about 5—6 percent. Elongation at break of the pick threads of synthetic polymeric fiber according to the invention have elongation at break from about 10 percent to about 27 percent, i.e., from 2 to about 4 times the elongation at break of the all-cotton thread, both being in the greige state. Following treatment with adhesive, by dipping, and with heat (2 minutes at 250°F.) the all-cotton thread has elongation at break of from 3.9 percent to 4.6 percent, while the blended fiber threads according to the invention have values of elongation at break of from 5.4 percent to 26.6 percent, which is to say from 40 percent to 300 percent greater elongation than, or from about 1½ to 3 times the elongation of all-cotton thread of like size and weight.

In tire cord fabric according to the invention, the fill thread 14 is broken easily in the shaping of a tire containing the fabric and is likewise easily handled in the conventional tire building operations. In the processing of tire cord fabric, including application of adhesives, drying, and stretching, the fill thread 14 provides the desired strength, transverse elongation and stability of the woven fabric. Fabric containing fill thread according to the invention is moreover significantly less subject to damage such as splitting during processing, or during handling and shipping. The greater elongation capabilities permit the fabric to be spread to a greater degree, enabling improved application of adhesives while avoiding the disadvantages of webbing and adhesion of one cord to the adjacent cords. Conventional spreading devices acting on the fabric thus provide better control of the fabric width as the fabric is advanced through successive stages of processing.

While certain representative embodiments and details have been shown for the purpose of illustrating the invention, it will be apparent to those skilled in this art that various changes and modifications may be made therein without departing from the spirit or scope of the invention.

We claim:

1. In a fabric having warp cords for reinforcing pneumatic tires and the like, and filling threads for holding the cords in spaced relation, the improvement wherein the filling threads comprise staple fibers of a synthetic polymer and cotton blended together.

2. The improvement of claim 1, wherein the staple fibers of the synthetic polymer are, by weight, from 20 to 80 percent of the total weight of the filling threads.

3. The improvement of claim 1, wherein the staple fibers of

|  | Weft Threads of the Prior Art | | Weft Threads According to the Present Invention Polyester/Cotton Blends | | | | | | | |
|---|---|---|---|---|---|---|---|---|---|---|
|  | All-Cotton 18s | All Cotton 21s | 20/80 21s | 30/70 21s | 40/60 21s | 60/40 21s | 70/30 21s | 80/20 21s | 60/40 26s | 60/40 20s |
| Greige: | | | | | | | | | | |
| Breaking Strength (lbs.) | 1.06 | .91 | .77 | .81 | .87 | .87 | .99 | 1.31 | .94 | 1.15 |
| Elongation at Break (percent) | 6.0 | 5.1 | 11.9 | 15.6 | 17.8 | 17.8 | 20.4 | 26.6 | 20.3 | 23.7 |
| Dipped, then Dried at 250° F., 2 Minutes: | | | | | | | | | | |
| Breaking Strength (lbs.) | 1.11 | .95 | .73 | .75 | .81 | .80 | .92 | 1.21 | .77 | 1.07 |
| Elongation at Break (percent) | 4.6 | 3.9 | 5.4 | 7.1 | 8.1 | 8.1 | 10.8 | 12.1 | 12.8 | 20.4 |

As will be seen from the data shown in the table, the breaking strength of the pick thread or yarn according to the invention does not differ significantly from the breaking strength of prior art all-cotton pick threads, namely, from 0.77 to 1.31 pounds compared with 0.91 and 1.06 pounds both in the greige condition and from 0.73 to 1.21 pounds compared with 0.95 and 1.11 pounds in the processed condition. The requisite limits of breaking strength desired for satisfactorily severing lengths of ply material and for shaping a tire are achieved while the pick thread or weft of the invention provides improved resistance to splitting and to rupture of the fabric in handling and processing, as well as improved spreadability and resistance to webbing.

The pick, weft, or filling threads of blended polyester and cotton in accordance with the invention are significantly less subject to loss of strength and elasticity when wet than the all-cotton threads heretofore in use.

the synthetic polymer and cotton are, by weight, about 60 and 40 percent, respectively, of the total weight of the filling threads.

4. The improvement of claim 1, wherein the filling threads, in the greige state, have a breaking strength of from 0.6 to 1.5 pounds and an elongation at break of from 10 percent to 30 percent.

5. The improvement of claim 1, wherein the synthetic polymer is polyester.

6. In a fabric having warp cords for reinforcing pneumatic tires and the like, and filling threads for holding the cords in spaced relation, the improvement wherein the filling threads comprise about 60 percent by weight of polyester staple fibers and about 40 percent by weight of cotton fibers, said filling threads in the greige state having a breaking strength of from 0.6 to 1.5 pounds and an elongation at break from 10 percent to 30 percent.